United States Patent
Sujan et al.

(10) Patent No.: US 9,297,325 B2
(45) Date of Patent: Mar. 29, 2016

(54) SYSTEMS AND METHODS FOR COMPENSATING AIRFLOW DETERMINATIONS FOR AIR COMPRESSOR BLEED

(71) Applicant: Cummins Inc., Columbus, IN (US)

(72) Inventors: Vivek A. Sujan, Columbus, IN (US); Ashwin Vyas, Columbus, IN (US)

(73) Assignee: Cummins Inc., Columbus, IN (US)

(*) Notice: Subject to any disclaimer, the term of this patent is extended or adjusted under 35 U.S.C. 154(b) by 597 days.

(21) Appl. No.: 13/648,434

(22) Filed: Oct. 10, 2012

(65) Prior Publication Data

US 2013/0192567 A1 Aug. 1, 2013

Related U.S. Application Data

(60) Provisional application No. 61/592,878, filed on Jan. 31, 2012.

(51) Int. Cl.
| | |
|---|---|
| *F02B 33/44* | (2006.01) |
| *F02B 33/00* | (2006.01) |
| *F02M 25/07* | (2006.01) |
| *F02D 41/18* | (2006.01) |
| *F02D 41/00* | (2006.01) |

(52) U.S. Cl.
CPC ............ *F02D 41/18* (2013.01); *F02D 41/0007* (2013.01); *Y02T 10/144* (2013.01)

(58) Field of Classification Search
CPC .......... F02B 33/44; F02B 37/16; F02B 33/02; F02B 37/00; F02B 37/02; F02B 37/10; F02D 41/0007; F02D 11/10; F02M 25/07; F02M 25/0707; F02M 25/0709; F02M 25/0711; F02M 25/0727; F02M 25/06; F02M 37/043; F04B 35/002; Y02T 10/144
USPC .............. 60/611, 600, 605.2; 123/559.1, 399, 123/572; 417/279, 364, 7; 702/85
See application file for complete search history.

(56) References Cited

U.S. PATENT DOCUMENTS

| | | | | |
|---|---|---|---|---|
| 2,628,015 | A * | 2/1953 | Neugebauer et al. | 417/364 |
| 3,020,901 | A * | 2/1962 | Cook | 123/559.1 |
| 3,204,859 | A * | 9/1965 | Crooks | 417/364 |
| 3,370,417 | A * | 2/1968 | Koziara | 60/611 |
| 3,513,929 | A * | 5/1970 | Kim | 180/302 |
| 4,232,997 | A * | 11/1980 | Grimmer et al. | 417/4 |
| 4,496,291 | A * | 1/1985 | Grimmer | 417/364 |
| 4,563,132 | A * | 1/1986 | Grimmer | 417/364 |
| 4,652,216 | A * | 3/1987 | Eslinger et al. | 417/364 |
| 5,154,585 | A * | 10/1992 | Spencer | 417/364 |
| 5,314,314 | A * | 5/1994 | Hinkle | 417/364 |
| 5,429,101 | A * | 7/1995 | Uebelhoer et al. | 123/572 |
| 5,460,784 | A | 10/1995 | Gillbrand et al. | |
| 6,170,469 | B1 | 1/2001 | Itoyama et al. | |
| 6,644,284 | B2 | 11/2003 | Pfitz | |

(Continued)

FOREIGN PATENT DOCUMENTS

| | | | | |
|---|---|---|---|---|
| DE | 102004037763 B4 * | 4/2009 | | F02B 37/10 |
| WO | WO 2008/079821 A1 | 7/2008 | | |

*Primary Examiner* — Thai Ba Trieu
(74) *Attorney, Agent, or Firm* — Taft, Stettinius & Hollister LLP

(57) ABSTRACT

Systems and methods are disclosed for compensating a mass airflow (MAF) sensor reading to account for the bleeding or diversion of intake airflow for compressor operation in determining fresh air flow into an engine. The engine is downstream from the compressor diversion.

14 Claims, 4 Drawing Sheets

(56) References Cited

U.S. PATENT DOCUMENTS

| | | |
|---|---|---|
| 7,162,865 B2 | 1/2007 | Weigand et al. |
| 7,251,989 B2 * | 8/2007 | Baeuerle .................... 73/114.37 |
| 8,371,120 B2 * | 2/2013 | Chadwell ......................... 60/611 |
| 8,567,191 B2 * | 10/2013 | Geyer .............................. 60/611 |
| 2007/0162243 A1 * | 7/2007 | Gelmetti et al. ................ 702/85 |
| 2008/0271447 A1 * | 11/2008 | Abel et al. ...................... 60/598 |
| 2009/0178405 A1 * | 7/2009 | Chadwell ........................ 60/600 |
| 2010/0139266 A1 * | 6/2010 | Gerum ............................ 60/600 |
| 2012/0063927 A1 * | 3/2012 | Murray et al. ................. 417/279 |
| 2012/0067044 A1 * | 3/2012 | Marx et al. ..................... 60/611 |
| 2012/0173118 A1 * | 7/2012 | Wang et al. ................... 701/102 |
| 2013/0333665 A1 * | 12/2013 | Pursifull ........................ 123/399 |
| 2014/0000570 A1 * | 1/2014 | Gibby ......................... 123/559.1 |

* cited by examiner

SYSTEMS AND METHODS FOR COMPENSATING AIRFLOW DETERMINATIONS FOR AIR COMPRESSOR BLEED

CROSS-REFERENCE TO RELATED APPLICATIONS

The present application claims the benefit of the filing date of Provisional Application No. 61/592,878 filed on Jan. 31, 2012, which is incorporated herein by reference.

FIELD OF THE INVENTION

The present invention relates generally to internal combustion engines and engine driven air compressor systems, and more particularly to systems and methods for compensating airflow determinations for air compressor bleed of pressurized intake air.

BACKGROUND

Environmental concerns and legislative mandates on emissions are increasing, therefore, an increase in efficiency and reduction in overall emissions for internal combustion engines is desired. One way to increase overall system efficiency is to bleed or divert a portion of pressurized air from an intake to the internal combustion engine into the inlet of an air compressor, reducing the overall work of the compressor for the same output. The use of pressurized fresh air to drive flow into the air tank is more reliable and takes less time to fill the tank than naturally aspirated compressors. However, this diversion affects the accuracy of the determination of the fresh airflow component of the charge flow to the intake of the engine during air compressor operation. Therefore, various control operations that use fresh airflow values for engine operation can be adversely affected and possibly result in an emissions spike and other adverse conditions during compressor operation. Therefore, further technological developments are desirable in this area.

SUMMARY

One embodiment is a unique method for compensating airflow determinations for air compressor bleed of pressurized intake air in an engine driven compressor system. Other embodiments include unique methods, systems, and apparatus to determine airflow to an engine and/or to an air compressor in engine-driven air compressor systems. Further embodiments, forms, objects, features, advantages, aspects, and benefits shall become apparent from the following description and drawings.

BRIEF DESCRIPTION OF THE DRAWINGS

The description herein makes reference to the accompanying drawings wherein like numerals refer to like parts throughout the several views, and wherein.

DESCRIPTION OF THE ILLUSTRATIVE EMBODIMENTS

Figure 1:
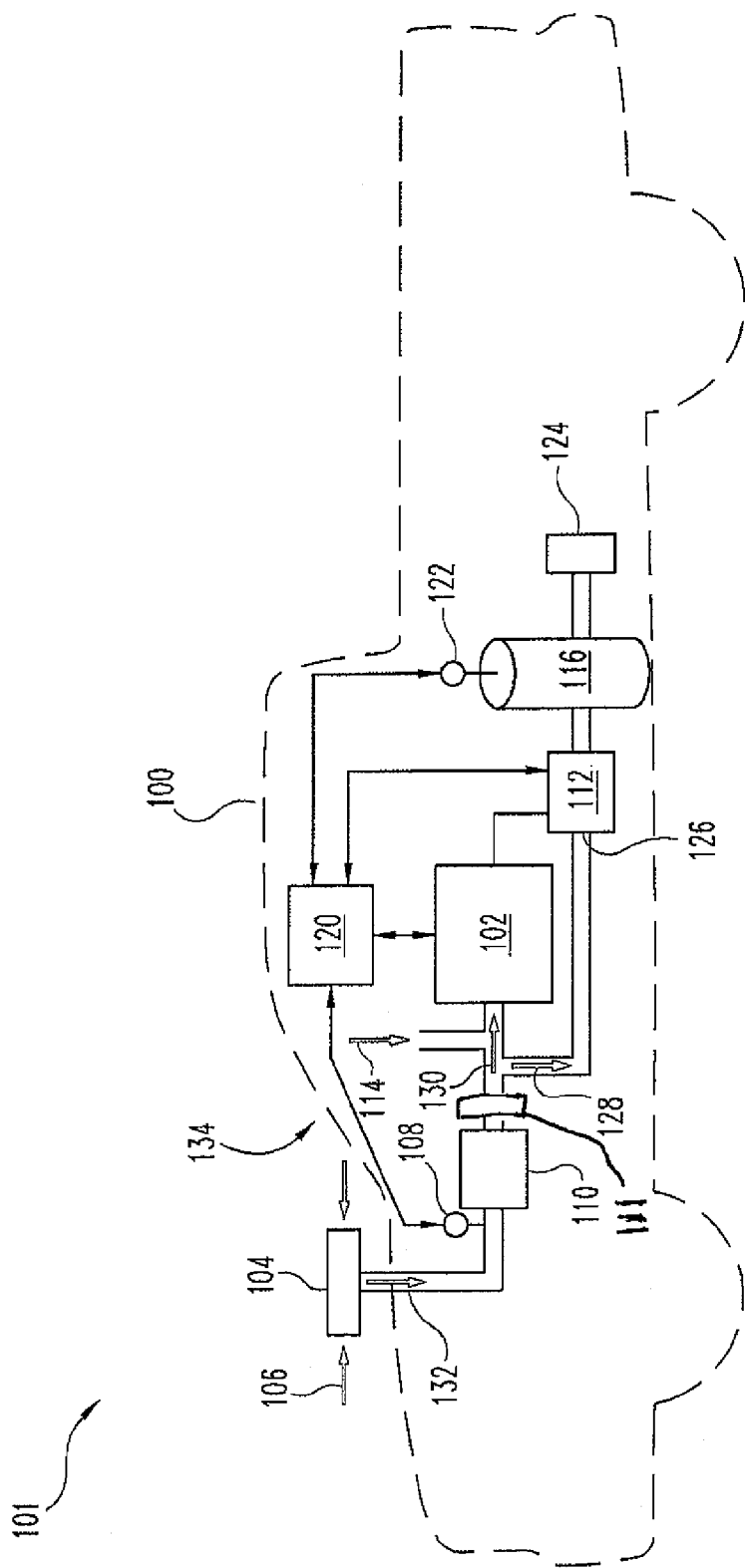
FIG. 1 is a schematic block diagram of one embodiment of an internal combustion engine and air compressor system.

For the purposes of promoting an understanding of the principles of the invention, reference will now be made to the embodiments illustrated in the drawings and specific language will be used to describe the same. It will nevertheless be understood that no limitation of the scope of the invention is thereby intended, any alterations and further modifications in the illustrated embodiments, and any further applications of the principles of the invention as illustrated therein as would normally occur to one skilled in the art to which the invention relates are contemplated herein.

FIG. 1 is a schematic block diagram of one embodiment of a system 101 for a vehicle 100 with an internal combustion engine 102 and an engine-driven air compressor 112. The system 101 includes an air intake assembly 134 to provide a source of fresh air to engine 102 and air compressor 112. In some embodiments, the air intake assembly 134 includes an air inlet 104 that draws ambient air 106 toward a pressure source 110. The pressure source 110 receives an airflow from inlet 104 and creates an inbound pressurized airflow 132. In certain embodiments, the pressure source 110 is a turbocharger; however, in other embodiments the pressure source can be a positive displacement supercharger, a dynamic compression supercharger, and/or any other device capable of increasing the pressure of the pressurized airflow 132.

A flow meter 108, such as mass airflow sensor (MAF), can be disposed upstream of the pressure source 110. In a specific, nonlimiting embodiment, the MAF 108 is disposed at a compressor inlet of a turbocharger. In certain embodiments, it is contemplated that the flow meter 108 can be a vane type air flow meter, a hot wire air flow meter, or any other flow meter 108 through which a mass air flow can be determined.

In certain embodiments, the air intake assembly 134 may include a number of features not shown in FIG. 1, including an air filter, noise reduction and flow altering devices, such as, but not limited to, baffles. Furthermore, the pressure source 110 can be in flow communication with a charge air cooler or an intercooler 111 between pressure source 110 and the take-off for compressor flow 128.

Downstream of the pressure source 110, the pressurized airflow can diverge into an engine fresh airflow 130 bound for an internal combustion engine 102 and a compressor airflow 128 bound for an air compressor 112. The internal combustion engine 102 can be a diesel engine, a gasoline engine, a Wankel rotary engine, or any other type of internal combustion engine 102. The system 101 can further include an exhaust gas recirculation system 114 which recirculates a portion of exhaust gas that mixes with the engine fresh airflow 130 bound for the internal combustion engine 102 downstream of the compressor airflow 128.

The air compressor 112 receives the compressor airflow at an inlet 126. In one embodiment, the air compressor 112 is a single cylinder positive-displacement air compressor such as shown in FIG. 2A. However, it is contemplated that air compressor 112 may include a rotating impeller to generate an increase in air pressure, can be a multiple piston positive-displacement compressor such as shown in FIG. 2B, or may be any other type of compressor which increases the pressure of the compressor airflow 128. It is also contemplated that compressor 112 is mechanically coupled to engine 102. The compressed air from the air compressor 112 can be stored in an air tank 116 which can include a pressure gauge 122. The pressure gauge 122 can be a Bourden gauge, a diaphragm gauge, a hydrostatic gauge, or any other digital and/or analog gauge which can provide or be converted to a pressure measurement of the air tank 116. The compressed air can be provided to air brakes 124, suspension equipment, and/or any other pneumatic devices or systems of the vehicle.

Figure 2:
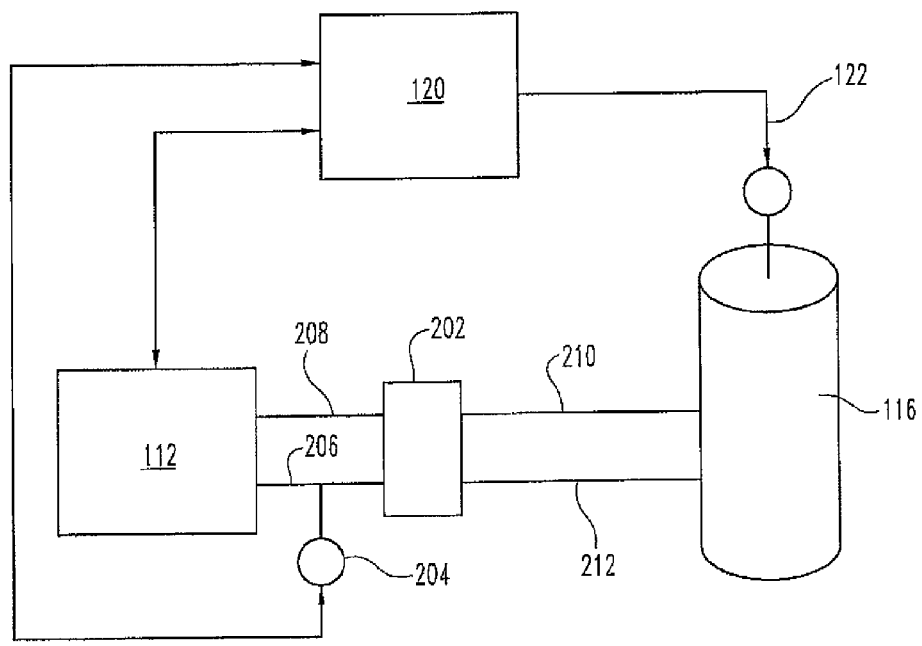
FIG. 2 is a schematic block diagram of an air compressor system.
Figure 2A:
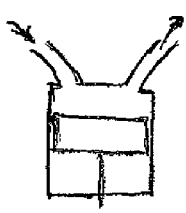
FIGS. 2A and 2B show schematic diagrams of a single cylinder positive displacement air compressor and a multiple cylinder positive displacement air compressor, respectively.
Figure 2B:
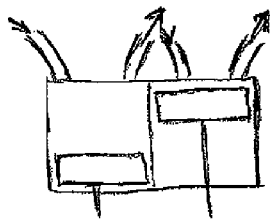

Referring to FIG. 2, one embodiment of an air compressor system is shown. The system includes a governor 202 that is mechanically connected to air compressor 112 and to air tank 116 to regulate airflow to air tank 116 between predetermined air tank pressures. In one embodiment, the air compressor 112 includes two unloader ports ported to one another and a supply port to air tank 116. The governor 202 also includes at least two unloader ports, at least one reservoir port, and at least one exhaust port (not shown). A signal line 206 is connected between compressor and governor unloader ports. The governor 202 and an unload signal line are connected to the other air compressor unloader port with connection 208. Air compressor 112 is also connected to air tank 116 with connection 210 that can be opened and closed with governor 202, and air tank 116 is connected to the reservoir port of governor 202 with pressure line 212.

One or more pressure sensors 204 can be connected to the air compressor 112 and the governor 202 at signal line 206. In some embodiments, a pressure sensor 204 such as a pressure transducer 204 can be utilized; however, it is contemplated that any pressure sensor combination can be utilized which can be correlated to a pressure between the air compressor 112 and the governor 202. In one embodiment, pressure sensor 204 provides a first reading when air compressor 112 is activated and pumping compressor airflow 128 and a second reading when compressor 112 is deactivated and not pumping compressor airflow 128.

In certain embodiments, the system 101 further includes a controller 120 structured to perform certain operations to determine an airflow into internal combustion engine 102. In certain embodiments, the controller 120 forms a portion of a processing subsystem including one or more computing devices having memory, processing, and communication hardware. The controller may be a single device or a distributed device, and the functions of the controller 120 may be performed by hardware or software.

In certain embodiments, the controller 120 includes one or more modules structured to functionally execute the operations of the controller 120. In certain embodiments, the controller 120 includes an operation conditions module, a fresh airflow module, and a flow reporting module. The description herein including modules emphasizes the structural independence of the aspects of the controller, and illustrates one grouping of operations and responsibilities of the controller 120. Other groupings that execute similar overall operations are understood within the scope of the present application. Modules may be implemented in hardware and/or software on computer readable medium, and modules may be distributed across various hardware or software components. More specific descriptions of certain embodiments of controller 120 operations are included in the section referencing FIG. 3. Certain operations described herein include interpreting one or more parameters.

Interpreting, as utilized herein, includes receiving values by any method known in the art, including at least receiving values from a datalink or network communication, receiving an electronic signal (e.g. a voltage, frequency, current, or PWM signal) indicative of the value, receiving a software parameter indicative of the value, reading the value from a memory location on a computer readable medium, receiving the value as a run-time parameter by any means known in the art, and/or by receiving a value by which the interpreted parameter can be calculated, and/or by referencing a default value that is interpreted to be the parameter value.

Figure 3:
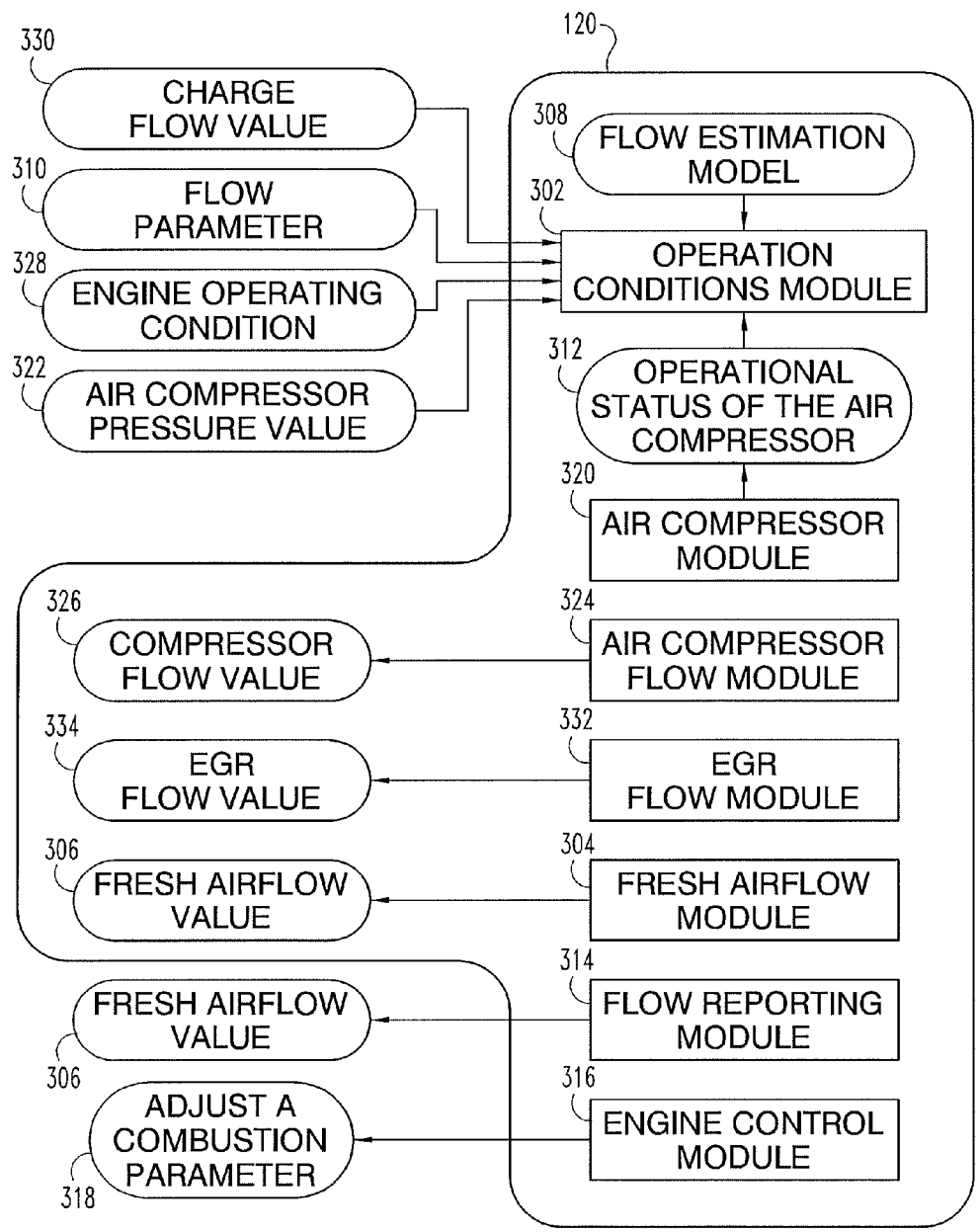
FIG. 3 is a schematic block diagram of a controller that functionally executes certain operations for determining airflows in an internal combustion engine driven air compressor system.

FIG. 3 is a schematic block diagram of a controller 120 that functionally executes certain operations for determining airflows to internal combustion engine 102 and air compressor 112. In an exemplary embodiment of the present invention, the controller 120 includes an operation conditions module 302 that receives various inputs and interprets an air compressor operational status 312 from air compressor module 320. Operation conditions module 302 further receives various inputs and interprets a flow estimation model 308 based on one or more of these inputs to determine the reduction in fresh airflow to the intake of engine 102 during operations of air compressor 112. The inputs to operation conditions module 302 and/or air compressor module 320 include a flow parameter 310 from mass airflow sensor 108, a charge flow value 330 at the intake of engine 102, engine operating condition 328 (such as speed, load, temperature, etc.) and an air compressor pressure value 322.

A fresh airflow module 304 determines a fresh airflow value 306 for engine fresh airflow 130 to the intake of internal combustion engine 102 in response to the operational status of the air compressor 312, the flow estimation model 308, and the flow parameter 310. A compressor flow module 324 determines a compressor flow value 326 for compressor airflow 128, which corresponds to the fresh airflow from pressure source 110 that is "bled off" or diverted from the intake of engine 102. An EGR flow module 332 determines an EGR flow value 334 that is indicative of the flow from the EGR system 114 that is returned to the engine intake and is determined from the mass charge flow to the intake and fresh airflow value 306.

A flow reporting module 314 determines the timing and systems in which to communicate fresh airflow value 306. For example, the fresh airflow value 306 can be reported to engine control module 316 along with compressor flow value 326 and EGR flow value 334. Engine control module 316 can adjust a combustion parameter 318 during engine operation according to the fresh airflow value 306 and EGR flow value 334 to the intake of engine 102, for which compensation is made for the diversion of fresh airflow to air compressor 112 during operation of air compressor 112.

Air compressor module 320 identifies when air compressor 112 is active and inactive from air compressor pressure value 322. In one embodiment, an air compressor mounted pressure switch on air compressor 112 and a governor mounted pressure transducer on governor 120 are used to detect activation and deactivation of air compressor 112. Signals indicating activation and deactivation of air compressor 112 determine air compressor operational status 312 which is communicated to operation conditions module 302. In other embodiments, activation and deactivation may be detected without a system sensor by, for example, monitoring or detecting changes in charge/boost pressure, changes in charge/boost temperature, changes in charge flow, changes in intake oxygen levels, changes in engine torque, exhaust emissions changes, or coolant temperature changes.

Flow estimation model 308 can be in the form of one or models that estimate the bleed or diversion of pressurized airflow 132 for compressor airflow 128 during activation of air compressor 112. In one embodiment, flow estimation model 308 includes a table-based compressor efficiency model. This embodiment of the model estimates the mass of compressor airflow 132 according to the following equation:

$$(\dot{m}_{bleed})_{approx} = V_{disp} \cdot R \cdot E_{spd} \cdot \rho C_d$$

where $V_{disp}$ is the displacement volume of the air compressor; R is the compressor to engine speed ratio;

$E_{spd}$ is the engine speed in rpm's;
ρ is the density of the boosted air; and
$C_d$ is the discharge coefficient, where the discharge coefficient captures the resistance to filling up of the supply tank 116 at a given pressure, and reflects the system volumetric efficiency.

For a given compressor, $C_d$ can be determined from a look up table stored in the memory of controller 120 where the discharge coefficient is based on the air compressor inlet boost pressure and speed of the air compressor 112, as indicated by the following function: $\Im(P_{Boost}, \omega_{air\ comp})$.

Figure 4:
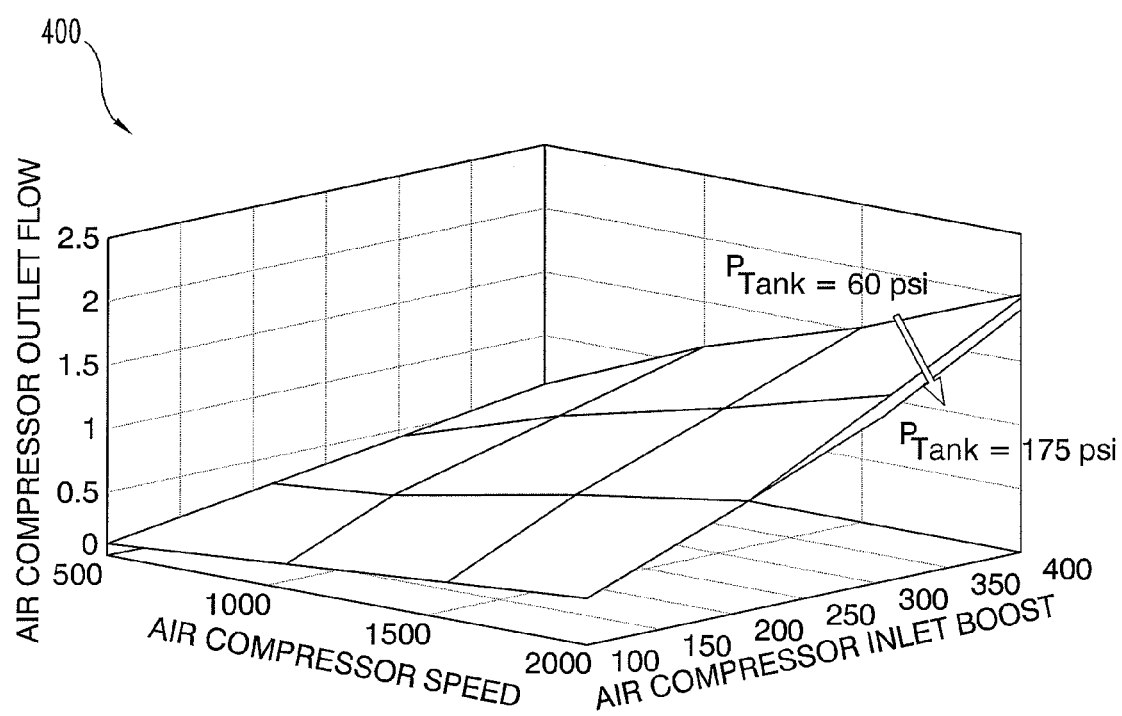
FIG. 4 is one embodiment of an illustrative compressor table.

In another embodiment, flow estimation model 308 includes a compressor flow estimation based on flow tables of the compressor and governor/air tank pressure. This model employs compressor flow maps where compressor airflow is mapped as a function of the air compressor inlet boost pressure ($P_{Boost}$), the speed of the air compressor ($\omega_{air\ comp}$), and the pressure of the tank ($P_{Tank}$), as indicated by the following function: $\Im(P_{Boost}, \omega_{air\ comp}, P_{Tank})$. Each of the pressure parameters can be determined from sensors positioned on the air compressor and the reservoir port of the governor, respectively. From these parameters, a compressor airflow 128 can be established from a map such as shown in FIG. 4.

In a variation of this embodiment, a virtual sensor for measuring the pressure of air tank 116 is employed rather than a physical sensor. The virtual pressure sensor is based on the Perfect Gas Law:

$$P_{Tank} = \frac{k_b \cdot T_{tank} \cdot N_{Molecules}}{V_{Tank}}$$

where $k_b$ is Boltzmann's constant;
$T_{Tank}$ is the absolute temperature of air tank 116;
$N_{molecules}$ is the number of molecules in the tank; and
$V_{Tank}$ is the volume of air tank 116.

This equation depends on knowing the volume of air tank 116 and the number of air molecules in the air tank 116. The number of air molecules is computed iteratively as:

$$N_{molecules}(t) = N_{molecules}(t-1) + \frac{\dot{m}(t)}{\frac{60}{\Delta t} \cdot m_{air}}$$

$$= N_{molecules}(t-1) + \frac{\dot{m}(t)}{\frac{60}{\Delta t} \cdot (4.81 \cdot 10^{-26})}$$

where $$N_{molecules}(0) = \frac{P_{Tank}(0) \cdot V_{Tank}}{k_b \cdot T_{Tank}(0)};$$

$P_{Tank}(0)$ from pressure switch, $T_{Tank} = T_{Ambient}$

In another embodiment, flow estimation model 308 includes a compressor flow estimation based on mass/momentum conservation. In this method, air compressor 112 is treated as a device within a control volume and the pressure and temperature of the upstream and downstream flow conditions are measured to determine the volumetric flow rate of air compressor 112. This method is based on the following relationships:

$$\text{Key relationships} \begin{cases} \text{Mass conservation: } \frac{d}{dt}\int_{CV}\rho d\mathcal{V} + \int_{CS}\rho v_m dA = 0 \\ \text{Momentum conservation: } \frac{d}{dt}\int_{CV}\rho v_1 d\mathcal{V} + \int_{CS}\rho v_1 v_m dA = \sum_{CV} F_i \\ \text{Gas law: } \rho = \frac{P}{RT} \end{cases}$$

The mass and momentum conservation equations give two equations with two unknowns, the air compressor inlet velocity and outlet velocity ($v_1$ and $v_2$), as follows.

Mass Conservation:

$$\rho_1 v_1 A_1 = \rho_2 v_2 A_2 \Rightarrow \frac{P_1}{RT_1} v_1 A_1$$

$$= \frac{P_2}{RT_2} v_2 A_2 \Rightarrow v_2$$

$$= \frac{P_1}{T_1} v_1 \frac{A_1}{A_2} \frac{T_2}{P_2}$$

$$= \frac{P_1}{P_2} \frac{A_1}{A_2} \frac{T_2}{T_1} v_1$$

Momentum Conservation:

$$\rho_2 v_2^2 A_2 - \rho_1 v_1^2 A_1 = A_2 P_2 - A_1 P_1 + F_{air\ comp}(\omega_{air\ comp}, P_{Tank}, P_1)$$

The air compressor force $F_{air\_comp}$ is based on a regression model that is created and calibrated as a regression model of air compressor operating parameters, and stored as a look up table in the controller during engine set-up. Furthermore, this model requires sensing of several parameters, including the boost pressure and boost temperature at the air compressor inlet ($P_1$ and $T_1$), the air compressor pressure and the air compressor temperature ($P_2$ and $T_2$), the tank pressure ($P_{Tank}$), the engine speed ($\omega_{air\ comp}$), and air compressor intake area $A_1$ and outlet area $A_2$.

One aspect of the present application includes a method comprising interpreting a flow parameter of an airflow bound for a source of pressurization; pressurizing the airflow; directing the pressurized airflow to an intake of an internal combustion engine; fluidly coupling the pressurized airflow to an air compressor at a location upstream of the intake of the internal combustion engine; interpreting an operational status of the air compressor, the air compressor structured to divert a first portion of the pressurized airflow when operating while a second portion of the pressurized airflow is received by the intake; and determining a flow estimate for at least one of the first and second portions of the pressurized airflow in response to the flow parameter and the operational status.

In one refinement, determining the flow estimate for at least one of the first and second portions further includes first determining a flow estimate for the first portion of the pressurized airflow.

In another refinement the method further comprises directing a stream of exhaust gas into the second portion of the pressurized airflow at a location downstream of the location the air compressor is fluidly coupled to the pressurized airflow and upstream of the intake, wherein the second portion of the pressurized airflow and the exhaust stream mix to provide a charge airflow to the intake. In a further refinement, the method includes determining a flow estimate for the stream of exhaust gas. In another further refinement, determining the flow estimate for the second portion of the pressurized airflow comprises determining a fresh airflow portion of the charge airflow. In yet a further refinement, the method further comprises adjusting a combustion parameter in response to the determination of the fresh airflow portion.

Another aspect of the present application includes a method comprising providing an internal combustion engine and an air compressor, each receiving a portion of pressurized air from a pressure source, interpreting an operational status of the air compressor, and in response to the operational status of the air compressor, determining a fresh airflow to the internal combustion engine.

In one refinement of this aspect, determining a fresh airflow to the internal combustion engine further includes determining an airflow from the pressurized air to the air compressor utilizing a flow estimation model. In a further refinement, determining the airflow to the air compressor further includes selecting at least one model selected from the group of models consisting of table based, air-tank pressure based, virtual air-tank pressure based, and mass-momentum conservation based models. In another further refinement, the method includes introducing an exhaust gas recirculated from the internal combustion engine into the portion of pressurized air received by the internal combustion engine. In yet a further refinement, the method includes determining a charge flow of the internal combustion engine, and determining an exhaust gas recirculation flow into the internal combustion engine in response to the charge flow and the fresh airflow to the internal combustion engine.

In another refinement of this aspect, the method includes interpreting a system fault and distinguishing a mass airflow sensor failure and an air-compressor failure in response to interpreting the system fault. In another refinement, the method includes adjusting a combustion parameter in response to the fresh airflow to the internal combustion engine. In yet another refinement, determining the operational status of the air compressor further comprises interpreting an engine operational condition.

Yet another aspect of the present application is an apparatus, comprising an internal combustion engine and an air compressor driven by the engine, the internal combustion engine includes an intake system with a mass airflow (MAF) sensor in communication with a controller, located upstream of a pressure source. The apparatus further includes an air compressor inlet located downstream of the pressure source and upstream of the internal combustion engine and means for determining an airflow from the pressure source into the air compressor.

One refinement of this aspect includes means for determining an operational status of the air compressor. In another refinement this aspect includes means for determining a fresh airflow into the internal combustion engine.

Still yet another aspect of the present application includes a system comprising a first airflow bound for a source of pressurization, a first flowpath operably coupled to receive a portion of a pressurized airflow from the source of pressurization and structured to provide a portion of the pressurized airflow to an air compressor, and a second flowpath operably coupled to receive a portion of the pressurized airflow from the source of pressurization and structured to provide the portion of the pressurized airflow to an internal combustion engine. The system further includes a controller including an operation conditions module structured to interpret an operational status of the air compressor, a flow estimation model, and a flow parameter of the first airflow, a fresh airflow module structured to determine a fresh airflow value of the second flowpath, in response to the operational status of the air compressor, the flow estimation model and the flow parameter of the first airflow, and a flow reporting module structured to provide the fresh airflow value.

In one refinement of this aspect the controller further comprises an engine control module structured to adjust a combustion parameter in response to the fresh airflow value. In another refinement, the operation conditions module is further structured to interpret at least one of an engine operating condition and an air compressor pressure differential value, wherein the controller further comprises an air compressor module structured to determine the operational status of the air compressor in response to the at least one of the engine operating condition and the air compressor pressure differential value.

In yet another refinement of this aspect the controller further comprises an air compressor flow module structured to determine a compressor flow value in response to at least one of the flow parameter and the fresh airflow value, and the operational status of the air compressor, the flow estimation model, and the flow parameter of the first airflow. In another refinement, an exhaust gas recirculation (EGR) outlet is connected to the first flowpath and upstream of the second flowpath. In yet another refinement, the operation conditions module is further structured to interpret a charge flow value of the internal combustion engine, and wherein the controller further comprises an EGR flow module structured to determine an EGR flow value in response to the charge flow value, the compressor flow value, and the flow parameter.

In another refinement of this aspect, the source of pressurization is a turbocharger and the internal combustion engine is a diesel engine. In a further refinement, the air compressor is a single cylinder air compressor.

While the invention has been illustrated and described in detail in the drawings and foregoing description, the same is to be considered as illustrative and not restrictive in character, it being understood that only certain exemplary embodiments have been shown and described and that all changes and modifications that come within the spirit of the inventions are desired to be protected. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A method of operating an internal combustion engine and an air compressor operably connected to one another, each receiving a portion of pressurized air from a pressure source, the internal combustion engine including a controller with instructions encoded on a non-transitory computer readable medium to execute:
   interpreting, with the controller, an operational status of the air compressor;
   in response to the operational status of the air compressor being active to indicate a diversion of the portion of pressurized air from the pressure source to the air compressor, determining, with the controller, a compressor flow value of the portion of pressurized air received from the pressure source by the air compressor, and further comprising determining, with the controller, a fresh airflow value to the internal combustion engine in response to the compressor flow value and a flow value for the pressurized air from the pressure source from a mass airflow sensor operably coupled to the controller; and adjusting, with the controller, a combustion parameter for the internal combustion engine in response to the fresh airflow value to the internal combustion engine to compensate for the diversion of the portion of pressurized air from the pressure source to the air compressor.

2. The method of claim 1, wherein determining the compressor flow value further includes utilizing a flow estimation model.

3. The method of claim 2, wherein utilizing the flow estimation model further includes selecting at least one model from the group of models consisting of compressor efficiency table based, air-tank pressure based, virtual air-tank pressure based, and mass-momentum conservation based models.

4. The method of claim 2, further including introducing an exhaust gas produced by the internal combustion engine into the portion of pressurized air received by the internal combustion engine for recirculation of the exhaust gas to the internal combustion engine.

5. The method of claim 4, further including determining a charge flow of the internal combustion engine, and determining an exhaust gas recirculation flow into the internal combustion engine in response to the charge flow and the fresh airflow to the internal combustion engine.

6. The method of claim 1, wherein determining the operational status of the air compressor further comprises interpreting an engine operational condition.

7. An engine driven compressor apparatus, comprising:
an internal combustion engine and an air compressor driven by the internal combustion engine, the internal combustion engine including an air intake system;
a mass airflow (MAF) sensor in the intake system in communication with a controller, the MAF sensor located upstream of a pressure source;
an air compressor inlet located downstream of the pressure source and upstream of the internal combustion engine; and
a controller operably connected to the MAF sensor, the internal combustion engine, and the air compressor, wherein the controller includes a non-transitory computer readable medium with instructions executable to:
determine an airflow from the intake system into the air compressor during operation of the air compressor in response to a flow parameter determined by the MAF sensor and a flow estimation model associated with the air compressor;
determine a fresh airflow into the internal combustion engine from the flow parameter determined by the MAF and the airflow into the air compressor; and
adjust a combustion parameter of the internal combustion engine in response to the fresh airflow.

8. The engine driven compressor apparatus of claim 7, wherein the instructions are executable to determine an operational status of the air compressor in response to a signal from a pressure sensor associated with the air compressor.

9. An internal combustion engine system, comprising:
a first airflow bound for a source of pressurization;
a first flowpath operably coupled to receive a first portion of a pressurized airflow from the source of pressurization and structured to provide the first portion of the pressurized airflow to an air compressor;
a second flowpath operably coupled to receive a second portion of the pressurized airflow from the source of pressurization and structured to provide the second portion of the pressurized airflow to an internal combustion engine; and
a controller operably connected to the internal combustion engine and the air compressor, the controller including a non-transitory computer readable medium with instructions executable to:
interpret an operational status of the air compressor, a flow estimation model having been stored in a memory of the controller, and a flow parameter of the first airflow measured by an airflow sensor and provided to the controller;
determine a fresh airflow value of the second flowpath in response to the operational status of the air compressor being active, the flow estimation model providing a compressor flow value as the air compressor being active, and a difference between the flow parameter of the first airflow and the compressor flow value; and
adjust a combustion parameter of the internal combustion engine in response to the fresh airflow value that compensates for a reduction in the fresh airflow value to the internal combustion engine indicated by the compressor flow value.

10. The internal combustion engine system of claim 9, wherein the controller further comprising executable instructions to interpret at least one of an engine operating condition in response to at least one sensor associated with the engine and an air compressor pressure differential value in response to at least one pressure sensor associated with the air compressor, and to determine the operational status of the air compressor is active in response to the at least one of the engine operating condition indicating a changed engine operating condition and the air compressor pressure differential value indicating a change in pressure.

11. The internal combustion engine system of claim 9, further including an exhaust gas recirculation (EGR) system connected to the internal combustion engine and to the second flowpath at a location downstream of the first flowpath.

12. The internal combustion engine system of claim 11, wherein the controller further comprising executable instructions to interpret a charge flow value of the internal combustion engine in response to one or more operating conditions of the engine, and to determine an EGR flow value in response to a difference between the charge flow value and, the fresh airflow value.

13. The internal combustion engine system of claim 9, wherein the internal combustion engine is a diesel engine.

14. The internal combustion engine system of claim 13, wherein the air compressor is a positive displacement air compressor.

* * * * *